United States Patent Office 3,300,601
Patented Jan. 24, 1967

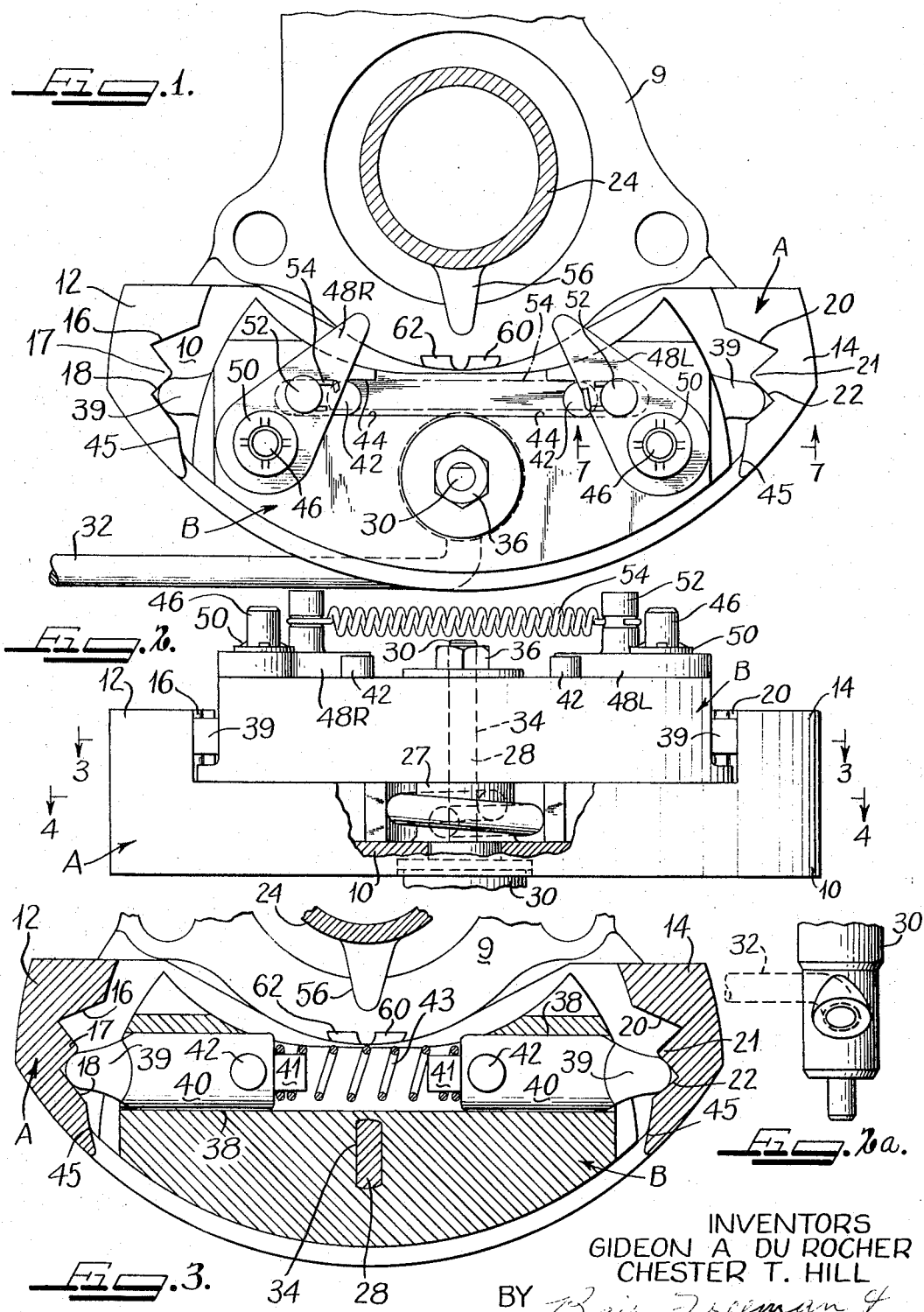

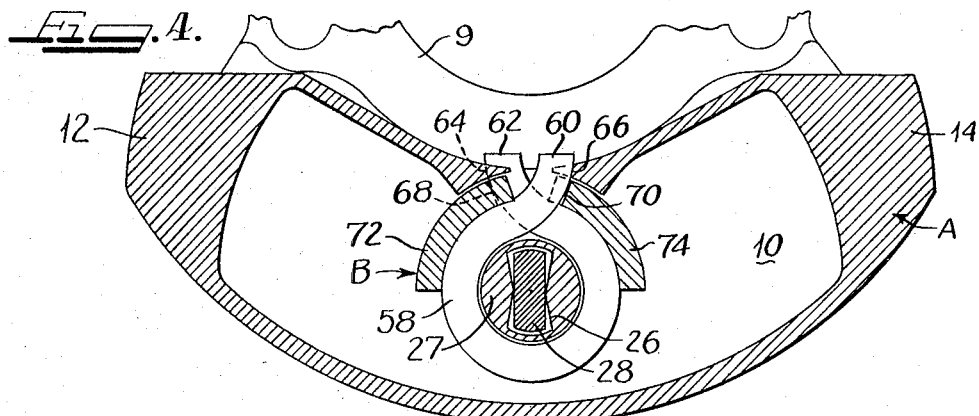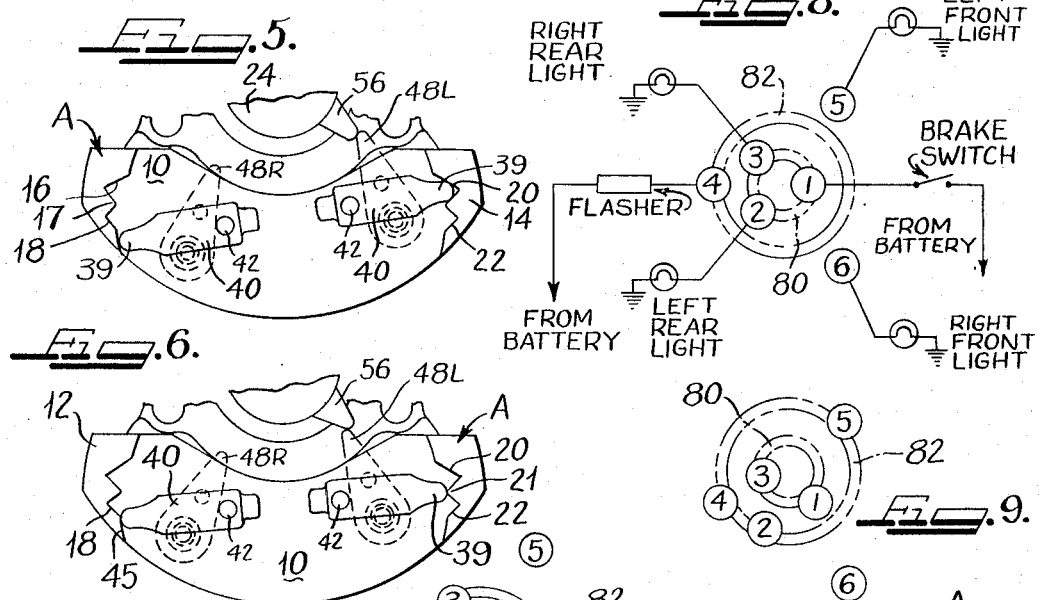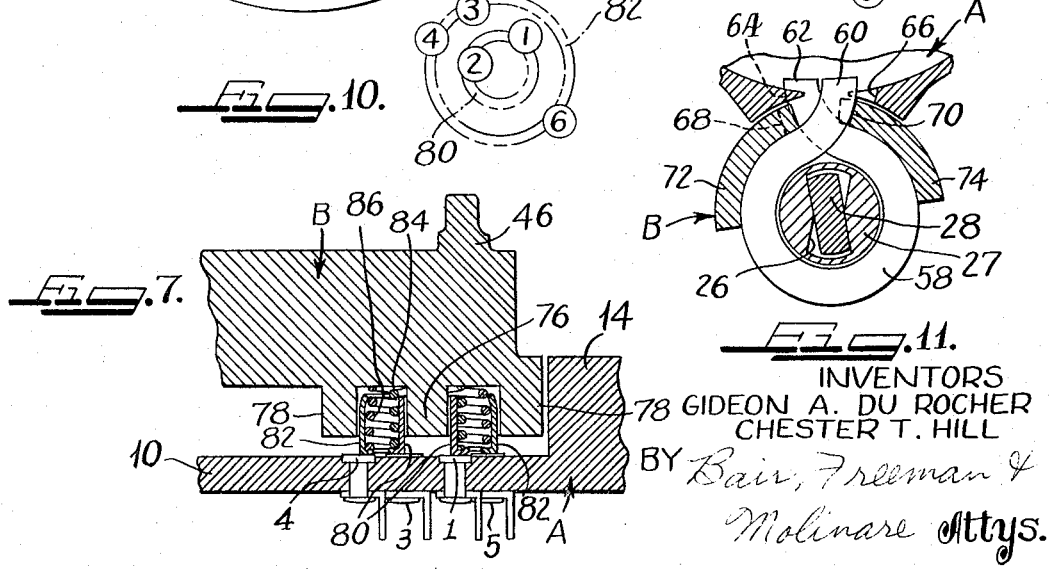

3,300,601
TURN SIGNAL
Gideon A. Du Rocher, Mount Clemens, and Chester T. Hill, Birmingham, Mich., assignors to Essex Wire Corporation
Filed Feb. 15, 1965, Ser. No. 432,768
9 Claims. (Cl. 200—61.34)

This invention relates to a turn signal for automobiles and the like having a steering shaft provided with a release cam, the turn signal being so mounted relative to the steering shaft and the cam that when manually actuated for a right or left turn it will be automatically returned to the neutral position after the turn has been made and as the steering shaft is returned to straightaway position.

One object of the invention is to provide a stationary member on which a movable member is mounted for rocking movement relative to the stationary member, a first means for latching the movable member in a rocked position in either direction from centered position and a second means operable by steering shaft rotation to release or cancel the first means, the movable member being also manually returnable to centered position if desired.

Another object is to provide means operable to normally center the movable member relative to the stationary member, and detent-and-notch mechanism to hold the movable member out of centered position when moved thereto manually.

Still another object is to provide detent-and-notch mechanism that may be cancelled by means of relieving the detent pressure by retraction of the detent from the notch which then permits the energy of a torsion return spring to return the movable member to centered position. The movable member carries cancel fingers which normally are clear of the turn signal release cam of the steering shaft but which are positioned in the path thereof when the turn signal is manually actuated to either "right turn" or "left turn" position so that when the steering wheel is rotated in the same direction as signaled, a cancel finger will be passed by but will be actuated when the steering shaft is rotated in the return direction so as to release its detent from the detent notch in which it was received. This permits the movable member to return to centered position under the action of the torsion return spring.

A further object is to provide a turn signal in which over-cancelling is eliminated by providing a torsion return spring, the energy of which is the same whether the cancel finger is impacted by the steering shaft cam slowly or rapidly.

An additional object is to provide a design which embodies a compression spring for detent pressure wherein the spring acts on two detents so that it is only necessary to compress this spring to effect over-ride operation (manual cancellation), the movable parts operating without undue strain and the order of the forces involved being kept low.

Another additional object is to provide a turn signal in which no plastic members are required to flex and act as spring members (which causes inconsistent or faulty operation). In the case of nylon, moisture sensitivity or hydroscopic characteristics render the design very unreliable when such flexing is required.

A further additional object is to provide operating members which may be made of plastic material but are not required to display any spring characteristics and as such a wide range of plastics may be employed, moisture sensitivity presenting no problem.

With these and other objects in view, our invention consists in the construction, arrangement and combination of the various parts of our turn signal, whereby the objects above contemplated are attained, as hereinafter more fully set forth, pointed out in our claims and illustrated in detail on the accompanying drawings, wherein:

FIG. 1 is a plan view axially of a steering shaft showing our turn signal mounted relative thereto;

FIG. 2 is an elevation thereof, being a projection from FIG. 1;

FIG. 2a is a continuation of the lower portion of FIG. 2 to show an actuating arm and a rock shaft for the turn signal.

FIG. 3 is a horizontal sectional view on the line 3—3 of FIG. 2 to show certain internal details of construction and particularly a detent latching means in neutral position;

FIG. 4 is a horizontal sectional view on the line 4—4 of FIG. 2 to show further internal details of construction, and particularly a torsion return spring, the parts of the turn signal being shown in neutral position;

FIG. 5 is a diagrammatic view similar to FIG. 3 but on a reduced scale showing the position of the detent means as a result of operation of the turn signal for a left turn, and shows by dotted lines how left-hand rotation of the steering shaft causes a release cam thereon to by-pass a cancel finger without releasing a detent;

FIG. 6 is a similar view showing how subsequent right-hand rotation of the steering shaft releases the detent through the medium of the cancel finger;

FIG. 7 is a sectional view on the line 7—7 of FIG. 1 showing a switch contact arrangement which may be used with our turn signal;

FIGS. 8, 9 and 10 are circuit diagrams of the switch showing respectively neutral, left and right turn positions of the movable contacts and the resulting circuits for the four signal lights of a vehicle on which the turn signal is mounted, and FIG. 11 is a view of a portion of FIG. 4, the parts of the turn signal being shown in position for signalling a left turn.

On the accompanying drawings we have used the reference character A to indicate, in general, a stationary member and B a movable member. The members A and B may be molded of suitable plastic material.

The stationary member A may comprise a base 10 having flanges 12 and 14 provided with detent notches 16, 18, 20, 22 as shown in FIG. 1. The base 10 is secured to a suitable bracket 9 which may be mounted in any suitable way with respect to a steering shaft 24.

The mounting base 10 has an upstanding hub 27 in which a butterfly shaped opening 26 is formed to oscillatably receive a blade-like portion 28 of a rock shaft 30 from which an actuating arm 32 extends as shown in FIGS. 1 and 2a.

The blade-like portion 28 fits in a slot 34 of the movable member B so that the rock shaft 30 can rock the member B as from the position of FIG. 3 to the position of FIG. 5 for a left turn (or in the opposite direction for a right turn). The upper end of the portion 28 is threaded for a lock nut 36 which retains the parts A and B assembled.

The movable member B is provided with a cross bore 38 (see FIG. 3) which slidably receives a pair of detents 40 having detent ends 39 for coaction with the detent notches 16, 18, 20 and 22. The detents have upstanding projections 42 which extend through a T-shaped slot 44 (see FIG. 1) in the top of the movable member B above the cross bore 38.

The movable member B is provided with a pair of pivot studs 46 on which cancel fingers 48L and 48R are pivoted, being retained thereon by retainer washers 50. The steering shaft 24 is provided with a release cam 56 coactable at certain times with the cancel fingers 48L and 48R. The cancel fingers are also provided with upstanding projections 52 connected together by a spring 54 which biases them to engage the projections 42 of the detents 40.

The detents 40 have reduced inner ends 41 surrounded by a compression spring 43 as shown in FIG. 3 which tends to keep the detent ends 39 engaged in any of the detent notches 16, 18, 20 and 22 with which they might be aligned, or in contact with lands 45 adjacent the notches 18 and 22.

A single coil torsion return spring 58 is provided surrounding the hub 27 and the blade-like portion 28 of the rock shaft 30 as shown in FIG. 4 which has ends 60 and 62 simultaneously engageable in notches 64 and 66 of the stationary member A and 68 and 70 of the movable member B. The notches 68 and 70 are formed in arcuate cylindrical flanges 72 and 74, respectively, depending from the movable member B and they serve to hold the coil spring 58 in its proper operating position in cooperation with the notches 64, 66, 68 and 70 and the hub 27.

FIGS. 7, 8, 9 and 10 illustrate a suitable switching arrangement for our turn signal which will be briefly described.

In FIG. 7 the body B is shown as having a projection 76 which is circular in horizontal cross section and is surrounded by a cylindrical projection 78. A small diameter thimble 80 surrounds the projection 76 and a large diameter thimble 82 is received in the cylindrical projection 78. A coil spring 84 surrounds the thimble 80 and a larger coil spring 86 is received in the thimble 82. These two springs serve to engage their respective thimbles with contacts 1, 2, 3, 4, 5 and 6 mounted in the stationary member A of the turn signal. The contacts are disposed as shown in FIGS. 8, 9 and 10, and the thimbles 80 and 82 coact therewith in different patterns as shown in the three figures. FIG. 8 shows the neutral position of the turn signal, FIG. 9 the left turn adjustment thereof and FIG. 10 the right turn adjustment thereof. Contact 1 is connected with the automobile battery through a brake switch and contact 2 is connected with the automobile battery through a flasher, as illustrated in FIG. 8. The contacts 2, 3, 5 and 6 are connected to the left and right, rear and front signal lights of the automobile as also shown.

PRACTICAL OPERATION

In the operation of my turn signal, assuming that the parts are in the neutral position shown in FIGS. 1 and 3, and that indication of a left turn is desirable, the actuating arm 32 may be pulled downwardly for rocking the movable member B counterclockwise as shown in FIG. 5. The left-hand detent end 39 will accordingly ride up on to the land 45 as shown in FIG. 5 and the right-hand detent end 39 will snap from the detent notch 22 into the detent notch 20. This action occurs in opposition to the return spring 58 which at the time of a left turn, will assume the position shown in FIG. 11, the spring end 60 being displaced by the notch 70 and the spring end 62 being held by the notch 64. Obviously, when the detent is released the spring will return the movable member B to the neutral position of FIGS. 3 and 4.

As the steering shaft 24 is rotated counterclockwise as shown in FIG. 5, the release cam 56 will engage the cancel finger 48L and swing it to the position shown against the bias of the spring 54 without affecting either of the detents 40. The cancel finger will merely be swung out of contact with the projection 42 of the left-turn detent 40. As soon as the cam passes the cancel finger, the finger will be swung back by the action of the spring 54 to again contact the projection 42 of the left-turn detent 40 where it is ready to act in its cancellation capacity when the steering shaft 24 is returned to straight-away position.

FIG. 6 illustrates the steering shaft being so returned and the cam 56 engaging the cancel finger 48L and moving it so that, through its engagement with the projection 42 of the left turn detent 40, it will retract the detent from the notch 20 and as soon as it is almost fully retracted as shown in FIG. 6, the movable member B will rock clockwise under the action of the return spring 58. The detent will then lock in the notch 22 with the parts again in the position shown in FIGS. 1 and 3. Obviously, rocking the movable member B in the opposite direction for a right turn is subsequently cancelled by counterclockwise rotation of the steering shaft after it has been rotated clockwise for the right-hand turn.

When the switching arrangement shown in FIG. 7 is in the neutral position of FIG. 8, the left rear light and the right rear light will be energized as stop light for signalling purposes any time the brake switch is closed. In this neutral position the contact thimble 80, it will be noted, is connecting all three contacts 1, 2 and 3, while the contact thimble 82 is in contact with the contact 4 only and therefore no circuit is provided through the flasher.

In the left turn position shown in FIG. 1, the brake switch can still energize the right rear light through contacts 1, 80 and 3 (see FIG. 9) whereas the left front light and the left rear light are energized from the battery through the flasher and contacts 4, 82 and 5, and 4, 82 and 2, respectively. When the contacts 80 and 82 are in position for a right-hand turn, the contact relationship will be as shown in FIG. 10 with the left rear light energized from contact 1 through contacts 80 and 2, and the right front light and the right rear light energized through contacts 6 and 3 from the contacts 4 and 82.

From the foregoing specification it will be obvious that we have provided a turn signal in which unique features overcome several basic faults that have been characteristic of direction signals both present and past. First of all, a latching type of mechanism is provided which results in good manual operation. Almost without exception, existing turn signals employ a detent mechanism that requires overpowering of the detent to accomplish the cancel operation. Our design is a latching mechanism that cancels by means of relieving the detent pressure when the detent is retracted from the detent notch. This permits the energy of the return spring 58 to return the movable member B to neutral position. Over-cancelling which results from over-powering the detent on a fast return of the steering wheel with such force that the turn signal goes through neutral and in error indicates an opposite turn is eliminated. In our device, the energy to return the movable member from cancel position is the same whether the cancel finger is impacted slowly or rapidly.

Latching designs of the past have been unsuccessful because of a manual cancel operation now used more extensively on free-way driving when shifting from lane to lane. This was always very harsh due to the necessity of overcoming a latching or hooking mechanism in the design. In our design, the manual cancellation is accomplished by merely turning the actuating arm 32 to neutral position and thereby causing the detent end 39 in one of the notches (20 for a left-hand turn or 16 for a right-hand turn) to be forced out of this notch and into the adjacent notch 22 or 18, respectively The V-formations 21 between the notch 20 and the notch 22, and 17 between the notch 16 and the notch 18 are so designed that the movable member will normally be retained in latched position but can readily be returned to neutral position during this over-riding operation.

Heretofore, problems were encountered in meeting this requirement, such as permanent damage to the mechanism from the force exerted, the requirement of forces of a high order which caused damage or slippage of the cancelling cam, thereby destroying timing, and when the turn signal is locked in a cancelling position due to foreign elements in the steering mechanism the force may be high enough to distract the driver and interfere with his ability to steer the vehicle. In our design, the spring 54 for detent pressure acts on both detents and it is only necessary to compress this spring to effect the override operation. All members of the design operate in a normal manner without undue strain and the order of the forces involved may be kept low.

The majority of existing turn signals constructed of nylon or acetal resins change characteristics when subjected to heat or cold because the plastic members are required to flex and act as spring members. Their characteristics change radically under extremes of temperature resulting in inconsistent or faulty operation, and in the case of nylon moisture sensitivity or hydroscopic characteristics render the design very unreliable. On the other hand, in our design plastics are employed but only as connecting members and are not required to display any spring characteristics and, as such, a wide range of plastics can be employed. Moisture sensitivity does not present a problem but such hydroscopic materials need not be used.

It will be noted that the turn signal circuitry can be located in one side only of the housing formed by the members A and B. This leaves the opposite side available for incorporation of a disabled-vehicle switch to be actuated by a push button (not shown). This combination is unique and economical. The turn signal contacts are energized by means of two concentric eyelets traversing the stationary contacts so as to hold both rear lamps and the stop switch contact energized when the switch is in the neutral position, and to connect right and left direction signal lights to the flasher contact depending on the direction being signaled.

Some changes may be made in the construction and arrangement of the parts of our turn signal without departing from the real spirit and purpose of our invention, and it is our intention to cover by our claims any modified forms of structure or use of mechanical equivalensts which may reasonably be included within their scope.

We claim as our invention:

1. In a turn signal, the combination of a steering shaft having a turn signal release cam, a stationary member, a rock shaft journaled therein, a movable member mounted on said rock shaft for rocking movement relative to said stationary member, means operable to normally center said movable member in neutral position relative to said stationary member, latch means for said movable member in any of three positions, namely, neutral, left turn indicating and right turn indicating positions, said latch means comprising a pair of detents slidably carried by and movable axially relative to said movable member, said stationary member having a pair of notches to receive said pair of detents in neutral position, a third notch for receiving one of said detents in left turn indicating position and a fourth notch for receiving the other of said detents in right turn indicating position, spring means biasing said detents to slide into engagement with said notches, a cancel finger for each of said detents and pivotally mounted on said movable member, said movable member, when rocked for a left turn indication, positioning the left turn cancel finger only in the path of said release cam, and when rocked for a right turn indication, positioning the right turn cancel finger only in the path of said release cam, each of said cancel fingers cooperating with its respective detent to slidably retract it from its turn indicating position whereupon said means operable to normally center said movable member relative to said stationary member returns said movable member to neutral position.

2. In a turn signal, the combination of steering shaft having a turn signal release cam, a stationary member, a rock shaft journaled therein, a movable member mounted on said rock shaft for rocking movement relative to said stationary member, means operable to normally center said movable member in neutral position relative to said stationary member, latch means for said movable member in neutral, left turn and right turn positions, said latch means comprising a pair of detents slidably carried by and movable relative to said movable member, said stationary member having a pair of notches to receive said pair of detents in neutral position, a third notch for receiving one of said detents in left turn position and a fourth notch for receiving the other of said detents in right turn position, spring means biasing said detents apart and toward engagement in said notches, a cancel finger for each of said detents and pivoted to said movable member, said movable member, when rocked for a left turn, projecting the left turn cancel finger in the path of said release cam, and when rocked for a right turn, projecting the right turn cancel finger in the path of said release cam, each of said cancel fingers cooperating with its respective detent to retract it from its turn indicating position whereupon said means operable to normally center said movable member relative to said stationary member returns said movable member to neutral position.

3. A turn signal according to claim 2 wherein said means operable to normally center said movable member relative to said stationary member comprises a torsion spring having its ends simultaneously engaged with said stationary member and said movable member in said neutral position.

4. A turn signal according to claim 2 wherein said means operable to normally center said movable member in neutral position relative to said stationary member comprises a torsion spring consisting of a coil and a pair of terminal ends, said stationary member having a hub around said rock shaft, said coil surrounding said hub, said stationary member having a pair of opposite shoulders engaging said terminal ends and said movable member also having a pair of opposite shoulders engaging said terminal ends.

6. A turn signal according to claim 2 wherein said movable member has a bore, said detents are slidable in said bore and said spring means comprises a compression spring located in said bore and interposed between said detents.

7. A turn signal according to claim 2 wherein said cancel fingers are pivoted to said movable member at a position spaced from the axis of said rock shaft, said detents are provided with projections against one side of which said cancel fingers are engageable, and spring means is provided normally effecting such engagement.

8. A turn signal according to claim 7 wherein said last mentioned spring means comprises a single tension spring connecting said cancel fingers together.

9. A turn signal according to claim 2 wherein said stationary member is provided with a pair of lands, one adapted to be engaged by said right turn detent when a left turn is indicated and the other adapted to be engaged by said left turn detent when a right turn is indicated.

References Cited by the Examiner
UNITED STATES PATENTS

| | | | |
|---|---|---|---|
| 2,608,627 | 8/1952 | Paule et al. | 200—61.34 |
| 2,611,046 | 9/1952 | Fuller | 200—61.34 |
| 3,197,586 | 7/1965 | Schmidt | 200—61.34 |

MILTON KAUFMAN, *Primary Examiner.*

UNITED STATES PATENT OFFICE
CERTIFICATE OF CORRECTION

Patent No. 3,300,601                      January 24, 1967

Gideon A. Du Rocher et al.

It is hereby certified that error appears in the above numbered patent requiring correction and that the said Letters Patent should read as corrected below.

Column 6, after line 42, insert the following:

5. A turn signal according to claim 4 wherein said shoulders of said movable member are formed by arcuate projections partly surrounding said coil of said torsion spring.

Signed and sealed this 14th day of November 1967.

(SEAL)
Attest:

Edward M. Fletcher, Jr.                      EDWARD J. BRENNER
Attesting Officer                            Commissioner of Patents